United States Patent [15] 3,699,253
Freedman [45] Oct. 17, 1972

[54] COORDINATE DETERMINING DEVICE EMPLOYING A SECOND ORDER DIFFERENCE SIGNAL TO DETERMINE APPROXIMATE CURSOR POSITION

[72] Inventor: Morris David Freedman, Southfield, Mich.

[73] Assignee: The Bendix Corporation

[22] Filed: July 6, 1971

[21] Appl. No.: 159,898

[52] U.S. Cl. .......... 178/19
[51] Int. Cl. .......... H04n 1/00
[58] Field of Search .......... 178/18, 19, 20; 346/365

[56] References Cited

UNITED STATES PATENTS

| | | | |
|---|---|---|---|
| 3,466,646 | 9/1969 | Lewin | 178/18 |
| 3,461,454 | 8/1969 | Steckenrider | 178/19 |
| 3,598,903 | 8/1971 | Johnson | 178/18 |
| 3,647,963 | 3/1972 | Bailey | 178/19 |

*Primary Examiner*—Kathleen H. Claffy
*Assistant Examiner*—Horst F. Brauner
*Attorney*—John S. Bell et al.

[57] ABSTRACT

Cursor position is determined by providing three signals that vary cyclically at different rates in response to cursor position. The three provided signals are used to provide two first order difference signals and one second order difference signal. The first order difference signals vary substantially slower than the three cyclic signals and thus indicate cursor position over a distance in which the cyclic signals change through more than one cycle. The second order difference signal varies at a rate substantially slower than the two first order differences and thus indicates cursor position over a distance in which the two first order signals vary through more than one cycle. A digital output signal indicating cursor position is provided by using the second order difference to form the most significant portion of the output, by using one of the first order differences to form a less significant portion, and by using one of the three cyclic signals to provide the least significant output signal.

8 Claims, 2 Drawing Figures

| CYCLES OF GRID 22 | $D_1$ | $D_2$ | $D_1 - D_2$ |
|---|---|---|---|
| 0 | 0 | 0 | 0 |
| 1 | 100 | 82 | 18 |
| 2 | 200 | 164 | 36 |
| 3 | 300 | 245 | 55 |
| 4 | 400 | 327 | 73 |
| 5 | 500 | 409 | 91 |
| 6 | 600 | 491 | 109 |
| 7 | 700 | 573 | 127 |
| 8 | 800 | 654 | 146 |
| 9 | 900 | 736 | 164 |
| 10 | 0 | 818 | 182 |
| 11 | 100 | 900 | 200 |
| 12 | 200 | 982 | 218 |
| 13 | 300 | 63 | 237 |
| . | . | . | . |
| . | . | . | . |
| 52 | 200 | 255 | 945 |
| 53 | 300 | 336 | 964 |
| 54 | 400 | 418 | 982 |
| 55 | 500 | 500 | 0 |
| 56 | 600 | 582 | 18 |
| 57 | 700 | 664 | 36 |
| 58 | 800 | 745 | 55 |
| 59 | 900 | 827 | 73 |
| 60 | 0 | 909 | 91 |
| 61 | 100 | 991 | 109 |
| 62 | 200 | 73 | 127 |
| 63 | 300 | 154 | 146 |
| . | . | . | . |
| . | . | . | . |
| 107 | 700 | 755 | 945 |
| 108 | 800 | 836 | 964 |
| 109 | 900 | 918 | 982 |
| 110 | 0 | 0 | 0 |

INVENTOR
MORRIS DAVID FREEDMAN

BY John S. Bell
ATTORNEY

COORDINATE DETERMINING DEVICE EMPLOYING A SECOND ORDER DIFFERENCE SIGNAL TO DETERMINE APPROXIMATE CURSOR POSITION

CROSS REFERENCE TO RELATED APPLICATION

A coordinate determining device that employs a first order difference signal to determine approximate cursor position and is therefore related to this application is disclosed in copending application Ser. No. 159899, filed July 6, 1971, which is assigned to The Bendix Corporation, assignee of this application.

BACKGROUND OF THE INVENTION

1. Field of the Invention

Coordinate determining devices.

2. Brief Description of the Prior Art

There are a number of devices that provide signals that vary cyclically in response to cursor displacement and that measure a characteristic such as the phase or amplitude of the cyclically varying signal in order to determine cursor position. Patent Application Ser. No. 805,559, now U.S. Pat. No. 3,647,963, "Automatic Coordinate Determining Device" by K. V. Bailey, assigned to The Bendix Corporation, discloses one such device. This application describes an electronic coordinate determining device including a conductive grid structure and a conductive cursor structure. A reference voltage is supplied to one of the two structures to induce a voltage in the other that varies cyclically in response to cursor displacement. In order to provide a signal that is a very precise representation of cursor position, the grid structure is constructed so that the induced voltage oscillates through one complete cycle in a relatively short interval, such as one inch. Cursor position can be determined to an accuracy of 1/1,000 of an inch. The cyclically varying induced voltage provides a complete or absolute determination of the relative position of the cursor within one of the small, 1 inch measuring cycles. However, this signal does not indicate which cycle the cursor is in. Cursor position is determined by continually measuring the change in the induced voltage during the entire time that the cursor is being moved to provide a summation signal indicating the number of complete cycles through which the induced voltage has changed. If the cursor is lifted from the grid structure so that there is no electromagnetic coupling between the grid and cursor structures and is moved from one position to another, the induced signal measuring apparatus will not provide an accurate determination of cursor position because there will be no change in the induced voltage.

SUMMARY OF THE INVENTION

This invention comprises a device that utilizes a second order difference in order to determine cursor position so that there is no need to continually record the change in any signal during cursor movement in order to determine the position of that cursor. Cursor position is determined by providing three difference signals that vary cyclically at slightly different rates in response to cursor displacement. The three cyclic signals vary through a complete cycle in response to relatively small intervals of cursor displacement. The three cyclic signals are used to provide two first order difference signals. The first being between the first and second cyclic signals, and the second being between the second and third cyclic signals. The first order differences vary at a rate substantially slower than the rate of variation of the three cyclic signals, and thus have a value that is directly proportional to cursor displacement over a distance in which the cyclic signals oscillate through many cycles. The two first order differences are used to provide a second order difference that varies at a rate substantially slower than the two first order differences. This second order difference, therefore, is directly proportional to cursor position over a distance in which the two first order differences vary through many cycles. The second order difference, the two first order differences, and the three cyclic signals thus identify different orders of magnitude of cursor position. An electronic signal processing circuit is described herein that uses the second order difference to provide the most significant portion of a digital output signal indicating cursor position. One of the first order differences is used to provide a less significant portion of the output signal, and one of the three cyclic signals provides the least significant portion of the output signal.

In the embodiment described herein, the three cyclic signals have values such that the second order difference signal begins a second cycle at a position offset from the position at which at least one of the first order signals begins a new cycle. Because of this offset, the second order difference signal and the one first order difference signal provide a unique combination of values for each cursor position over a distance in which the second order difference changes through more than one cycle. The invention, therefore, also includes apparatus for receiving the second order difference and the one first order difference and providing an output signal identifying cursor position that has a different value for different combinations of received signal values. An embodiment of this invention is described herein that includes a number generator that provides an output determined by the value of both first and second order differences. The number generator output signal identifies cursor position over a distance in which the most slowly varying signal, namely the second order difference signal, changes through more than one cycle. Yet, there is no need to record the change in any signal during cursor movement or to record any other history of cursor position in order to provide this positional output.

The apparatus illustrated herein for receiving the first and second order differences and identifying cursor position also compensates for errors in the second order difference signal. In the absence of any error, the second order difference may possess one of a finite number of values for each value of one of the first order differences illustrated herein. The received or measured second order difference is compared with each value that the second order difference is permitted to have for the received first order difference in the absence of any error. This comparison is made to determine the permitted difference closest to the received second order difference. In a system in which the first and second order differences do not begin new cycles when the cursor is located at the same position, there is one permitted value of the second order difference signal that is closer to the measured value of the second order difference than all other permitted values corresponding to cursor positions within a distance in which the second order difference value changes through more than one cycle. The permitted value of the second difference closest to the measured value of that difference thus uniquelyidentifies approximate cursor position within a distance in which the second order difference signal varies by more than one cycle, namely through two cycles in the embodiment illustrated herein. The use of the closest permitted value of the second order difference to provide an output indicating cursor position thus insures that small errors in the value of the difference signal will not cause errors in the output signal indicating cursor position.

In the embodiments illustrated herein, the apparatus for providing the three different cyclic signals comprises three electrically conductive grid structures. Each grid structure defines a set of measuring intervals. Each interval of each one set is substantially equal to all other intervals of that one set. And, the intervals of the first set are smaller than those of the second set, which in turn are smaller than those of the third set. The first, second, and third cyclic signals identify the relative position of the cursor within he intervals of the first, second, and third sets, respectively, proximate the cursor. The use of three, rather than two, cyclic position indicating signals in order to identify cursor position permits construction of an embodiment for obtaining measurements along a substantial distance in which all of the grid structures are disclosed on a single nonconductive backing. If one attempted to obtain measurements along a similar distance using only two different sets of measuring intervals, there would have to be such a small difference between the sizes of the intervals of the two sets that the thickness of the wires forming those two sets would prevent their being disposed on a single surface.

BRIEF DESCRIPTION OF THE DRAWING

Further objects, features, and advantages of this invention, which is defined by the appended claims, will become apparent from a consideration of the following description and accompanying drawings in which:

DETAILED DESCRIPTION OF THE PREFERRED EMBODIMENT

Figures 1, 2:
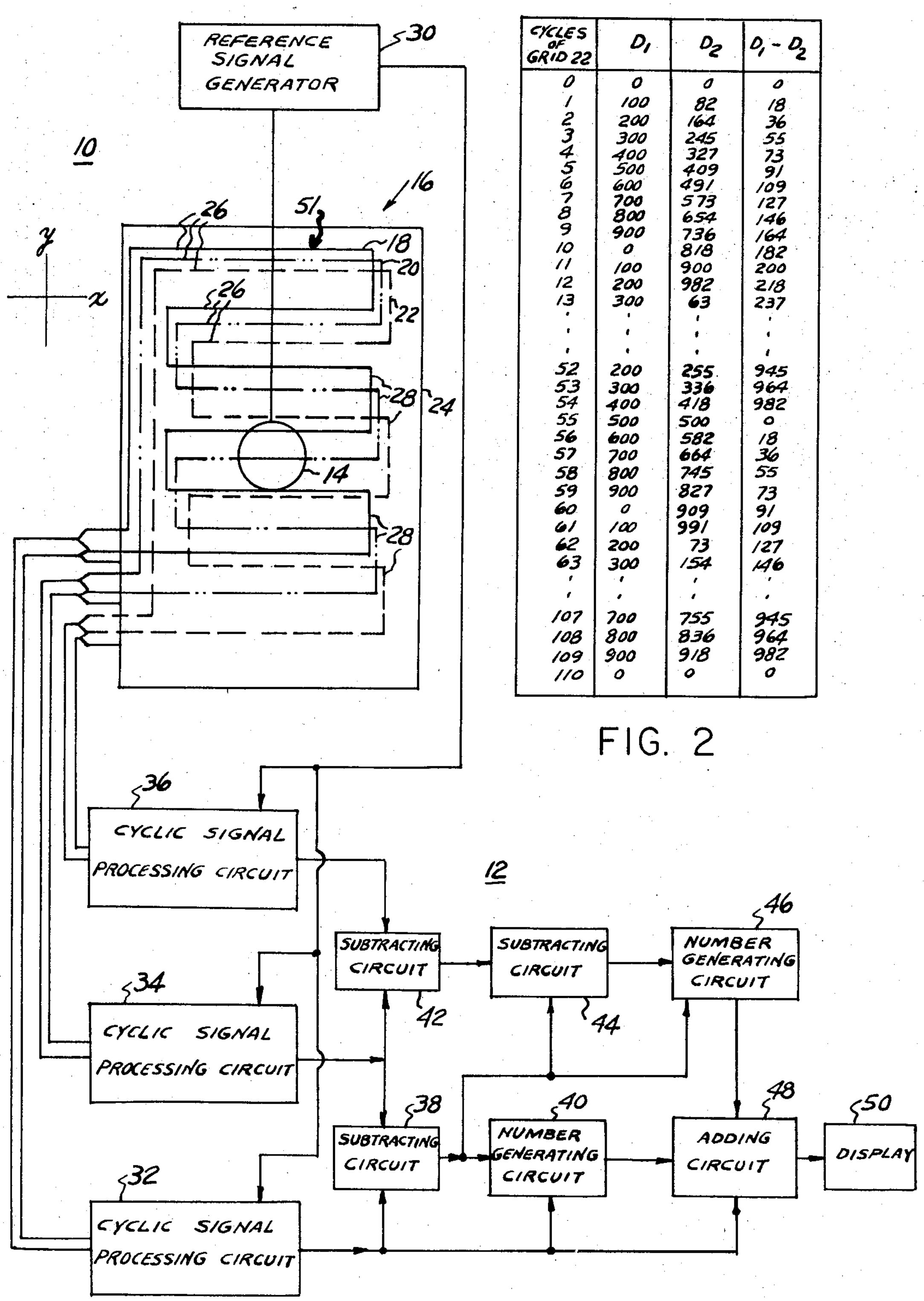
FIG. 1 is a schematic, circuit diagram of one embodiment of the position determining device of this invention.
FIG. 2 is a table that illustrates the operation of the apparatus of FIG. 1.

FIG. 1 illustrates a device 10 that includes electronic signal processing apparatus 12 for determining the Y coordinate position of a cursor 14 on a multi-element grid structure 16. The X coordinate position of cursor 14 can be determined using apparatus similar to that for determining Y coordinate position. This structure is not shown in order to simplify explanation of this invention.

The grid structure 16 comprises three separate, electrically conductive elements 18, 20, and 22 disposed on a single electrically nonconductive backing 24. Each separate conductive element 18–c8 22 is convoluted to form a plurality of long, parallel conductive portions 26 that are alternately connected at their ends by shorter connecting portions 28. The shorter connecting portions 28 of each continuous conductive element, such as element 18, are appropriately electrically insulated from the other conductive elements, such as elements 20 and 22. Techniques for providing this electrical isolation are well known in the grid art. For example, an electrically non-conductive coating or covering may be formed over each point of a long, parallel portion 26 of a conductive element that is crossed by a connecting portion 28 of a different element. The connecting portion 28 of the other element is then disposed on this nonconductive coating or covering.

The grid structure 16 also includes three offset or quadrature conductive grid elements (not shown). Quadrature grid elements are illustrated in the above-mentioned patent application Ser. No. 805,559 and the cross reference application Ser. No. 159899. They are not shown in FIG. 1 because it is believed that they would so confuse the drawing that the relative spacing between the long, parallel portions 26 of grids 18, 20, and 22 would not be readily apparent from the drawing. The quadrature elements may be conveniently disposed on the same side of nonconductive backing 24 as are grid elements 18, 20, and 22 so that the opposite side of backing 24 is free to receive grids for identifying X axis cursor position. Thus, the grid structure of this invention requires only one nonconductive backing element. The three conductive elements 18–22, along with their three associated quadrature grid elements, define three different sets of measuring intervals along the Y axis of grid structure 16. The lengths of the intervals of the three sets have a relative ratio of 9:10:11. That is, the parallel portions of grid element 18 are spaced 1 inch apart to define 1 inch measuring intervals, those of grid element 20 spaced 1-1/9 of an inch apart to define 1-1/9 inch measuring intervals, and those of grid element 22 spaced 1-2/9 of an inch apart to define 1-2/9 inch measuring intervals.

Because of the differences in the sizes of the measuring intervals of the three sets, the relative position of corresponding intervals of the three sets changes along the Y axis of grid structure 16. For simplicity, FIG. 1 shows only a few intervals of each set. However, large embodiments of the grid structure of this invention can be constructed and will provide output signals identifying cursor position over a long distance. In a large embodiment, even though the intervals defined by each of the three grid elements are of different sizes, the long, parallel portions 26 of the various grid will align at various positions on the grid structure. The parallel portions 26 of grids 18 and 20 will be aligned at positions defined by the equation:

$$D = N_1 A = N_2 B$$

where:

$D$ = the distance between positions of alignment of parallel portions 26 of grid elements 18 and 20;

$A$ & $B$ = the lengths of each of the intervals defined by grids 18 and 20, respectively; and $N_1$ & $N_2$ = the smallest ratio of whole number integers satisfying the ratio $N_1/N_2 = B/A$ Similarly, the long, parallel portions 26 of grids 20 and 22 align at positions defined by the equation:

$$D' = N_3B = N_4C$$

where:

$D'$ = the distance between positions of alignment of parallel portions 26 of grids 20 and 22;

$C$ = the lengths of each of the intervals provided by the grids 22; and $N_3$ & $N_4$ = the smallest whole number an integer satisfying the ratio $N_3/N_4 = C/B$ However, even though grids 18 and 20 align at a number of different positions and grids 20 and 22 align at a number of different positions, the three grids will not all align at the same position for a distance defined by the equation:

$$D'' = N_5(N_1A) = N_6(N_3B)$$

where:

*$D''$ = the distance between the positions at which all three grids align; and*

$N_5$ & $N_6$ = the smallest integer satisfying the ratio $N_5/N = N_3/N_2$

For the particular embodiment illustrated herein with grid elements defining measuring intervals of 1 inch, 1-1/9 of an inch, and 1-2/9 of an inch, respectively, there is a 110 inch distance between the positions at which the parallel portions 26 of all of the three grid structures 18, 20, and 22 align with each other. The electronic apparatus 12 provides an output identifying the Y coordinate position of cursor 14 over this entire 110 inch distance. Further, apparatus 12 provides this output without requiring that the change in any signal produced by cursor displacement be continually measured and recorded during cursor movement. There is no requirement that any electrical communication be maintained between cursor 14 and grid structure 16 during movement of cursor 14 from one position to another on grid structure 16. And, there is no requirement that signal generating circuitry 12 be operating during cursor motion. Apparatus 12 provides an accurate identification of cursor position upon being activated.

The electronic apparatus 12 includes a reference signal generator 30 for supplying an excitation signal to cursor 14. This excitation signal causes voltages to be induced in the three conductive grid elements 18, 20, and 22, and their associated quadrature elements. Three identical signal processing circuits 32, 34, and 36 receive the induced voltages and provide output signals that vary through one complete cycle in response to Y axis cursor displacements of 1 inch, 1-1/9 of an inch, and 1-2/9 of an inch, respectively. These three identical circuits are illustrated in detail in the above cross referenced application Ser. No. 159,899. A subtracting circuit 38 is positioned to receive the output signals provided by processing circuits 32 and 34 and provide an output equal to the difference between those two received signals. The values that this output signal will have in the absence of any error for various cursor positions on the 9:10:11 grid structure 16 are provided in the second column labelled $D_1$ of the table of FIG. 2. A number generating circuit 40 receives the output from subtracting circuit 38 and the signals provided by processing circuit 32 and provides an output identifying the difference between the signals provided by processing circuits 32 and 34. The output provided by number generating circuit 40 is unaffected by errors in the signal provided by subtracting circuit 38 that are smaller than the change in this signal caused by a cursor displacement that changes the signal provided by processing circuit 32 through one-half cycle. The number generating circuit 40 is illustrated in detail in FIG. 2 of the above cross referenced application Ser. No. 159,899.

A second subtracting circuit 42 received the output signals from processing circuits 34 and 36 and provides an output equal to the difference between those two received signals. The values that this output signal will have in the absence of any errors for various cursor positions on grid structure 16 are illustrated in the third column labelled $D_2$ on the table of FIG. 2. These two differences $D_1$ and $D_2$ are first order differences. A third subtracting circuit 44 receives these two first order differences and provides a second order difference equal to the difference between the two first order differences provided by subtracting circuits 38 and 42. The values that this second order difference will have in the absence of any error for various Y axis cursor positions are illustrated in the last column of the table of FIG. 2. A second number generating circuit 46 that is identical to number generating circuit 40 receives the second order difference provided by subtracting circuit 44 and the first order difference provided by subtracting circuit 38 and provides a slowly varying output signal that identifies Y axis cursor position to a relatively low degree of accuracy. The output from number generating circuit 46 is unaffected by any error in the second order difference provided by subtracting circuit 44 smaller than the change in that second order difference caused by a cursor displacement that changes the first order difference provided by subtracting circuit 38 through $1/2E$ cycles, where $E$ equals the number of cycles through which the second order difference $D_1 - D_2$ is permitted to vary. An adding circuit 48 receives signals from generating circuits 46 and 40, and signals from processing circuit 32, and combines these three received signals to provide an output that precisely identifies the Y axis position of cursor 14 on grid structure 16. A display 50 receives the summation signal provided by adding circuit 48 and displays that signal for an operator.

In operation, reference signal generator 30 supplies an excitation signal such as a high-frequency, sinusoidally varying AC current to cursor 14. This excitation signal induces voltages in the conductive grid elements of grid structure 16. Signal processing circuit 32 receives the voltages induced in grid element 18 and its associated quadrature element and provides a cyclic, linearly varying, sawtooth output signal that varies through one cycle in response to a Y axis cursor displacement equal to the distance between adjacent parallel portions 26 of grid element 18. Similarly, circuits 34 and 36 receive the voltages induced in elements 20 and 22 respectively, and their associated quadrature elements, and provide output signals that vary through one complete cycle in response to Y axis cursor displacements equal to the spacing between adjacent parallel portions 26 of grid elements 20 and 22, respectively. Subtracting circuit 38 determines the difference between the signals provided by processing circuits 32 and 34. Number generating circuit 40 compensates for, or in other words eliminates, any small errors that might occur in this difference.

Subtracting circuit 44 determines the second order difference between the two first order differences provided by subtracting circuits 38 and 42. Number generating circuit 46 receives the second order difference provided by subtracting circuit 44 and the first order difference provided by subtracting circuit 38 and generates each second order difference that the signal from circuit 44 is permitted to have in the absence of any error in the particular signal received from circuit 38. As can be seen from the table of FIG. 2 in the absence of any large error, there is one value of the permitted differences $D_1 - D_2$ that will be closer to the second order difference provided by subtracting circuit 44 than all other permitted differences representing cursor positions over a distance in which the second order difference provided by subtracting circuit 44 changes through two complete cycles. To illustrate with an example, suppose subtracting circuit 38 provides a value of 300, and subtracting circuit 44 provides a value of 57. As FIG. 2 shows, there is only one permitted value of the second order difference $D_1 - D_2$ that is closest to this measured value of 57, namely the permitted value of 55 which occurs while the cursor is positioned approximately 3 inches from the edge 51 of grid structure 16. Note that 146 is the lowest correct value that the second order difference $D_1 - D_2$ is permitted to have for a first order difference $D_1$ of 300, in the second cycle of the second cycle of that second order difference. This value is significantly farther from the measured value 57 than is the permitted value 55. Number generating circuit 46 thus responds to the combination of values received from subtracting circuit 38 and 44 and provides the closest permitted value of the second order difference $D_1 - D_2$ to adding circuit 48.

The output from number generating circuit 46 is a slowly varying signal that uniquely identifies approximate cursor position over a distance in which the second order difference provided by subtracting circuit 44 varies through two complete cycles. Adding circuit 48 also receives signals from circuits 32 and 40 and combines all three received signals to provide an output that precisely identifies cursor position. The cyclic signal from processing circuit 32 varies most rapidly and thus forms the least significant portion of the output signal provided by adding circuit 48. The first order difference $D_1$ provided by number generating circuit 40 provides the next most significant portion of the output signal. And, the second order difference provided by number generating circuit 48 provides the most significant portion of the output signal. The signal provided by adding circuit 48 identifying cursor position is transmitted to a display 50 which displays that signal for an operator.

Having thus described one embodiment of this invention, a number of modifications will readily occur to those skilled in the art. For example, sets of intervals having relative sizes other than the 9:10:11 example of the preferred embodiment can be used in position determining devices. Different sets of intervals having almost any different relative ratios may be used to practice this invention. Further, although it has not previously been realized, almost all relative ratios of intervals will provide a unique combination of first and second order differences that uniquely identify cursor position over a distance in which the second order difference changes through more than one cycle. In addition, other structures can be used to obtain cyclic signals that vary at slightly different rates so that the differences between those signals can be used to produce first and second order differences which are in turn used to identify cursor position.

Therefore, what is claimed is:

1. A device for determining the coordinate position of a cursor comprising:
signal providing means for providing first, second, and third coordinate position indicating signals that vary cyclically in response to cursor displacement, said second signal varying slower than said first signal so that the difference between said first and second signals is directly proportional to cursor displacement for a distance in which said first and second signals vary through more than one cycle, and said third signal varying slower than said second signal so that the difference between said second and third signals is directly proportional to cursor displacement for a distance in which said second and third signals vary through more than one cycle; and
subtracting means for providing a first order difference between said first and second signals, a second first order difference between said second and third signals, and a second order difference between said first and second differences, said first order differences varying cyclically in response to cursor displacement, said second order difference varying at a rate substantially slower than said first order differences and thereby being directly proportional to cursor displacement for a distance in which said first order differences vary through more than one cycle; and
means for receiving said second order difference and providing an output indicating cursor position.

2. The device of claim 1 in which:
said signal providing means include means defining first, second, and third sets of measuring intervals along a selected dimension, the intervals of said second set being slightly larger than the intervals of said first set and slightly smaller than the intervals of said third set;
said first signal identifies the relative position on said cursor within the interval of said first set proximate said cursor;
said second signal identifies the relative position of said cursor within the interval of said second set proximate said cursor;
said third set being slightly larger than said intervals of said second set, and said third signal identifies the relative position of said cursor within the interval of said third set proximate said cursor.

3. The device of claim 2 in which:
said first, second, and third signals each comprise linearly varying, digital signals, said first signal changing by one cycle in response to cursor displacement equal to one interval of said first set, said second signal changing by one cycle in response to cursor displacement equal to an interval of said second set, and said third signal changing by one cycle in response to cursor displacement equal to one interval of said third set.

4. The device of claim 3 in which said means defining said first, second, and third sets of intervals comprise electrically conductive grid means disposed on a single electrically nonconductive backing.

5. The device of claim 3 in which:

said third difference varies cyclically in response to cursor displacement;

said first order and second order differences provide a unique combination of values for each cursor position over a distance in which said third difference signal varies through more than one cycle; and said output providing means also receives one of said first order differences and provides an output determined by the combination of received values to indicate cursor position over a distance in which said second order difference changes through more than one complete cycle.

6. The device of claim 5 in which:

said second order difference is permitted to have only a finite number of different values for any particular value of said one first order difference in the absence of any error;

said output providing means also compensates for errors in said second order difference and includes:

means for determining each value that said second order difference is permitted to have for a value of said one of said first order differences in the absence of any error and for comparing said second order difference with each of said permitted values to determine the permitted difference value closest to said second order difference; and means for utilizing said closest permitted difference value to provide a readout signal indicating cursor position, there being only one permitted value closest to said second order difference for a distance in which said second order difference changes through more than one complete cycle, the permitted difference being closest to said second order difference being unaffected by errors in said second order difference smaller than the change in said second order difference signal caused by cursor displacement changing said one first order difference signal by $1/2E$ cycles, where $E$ equals the number of cycles through which said second order difference is permitted to change.

7. The device of claim 6 in which:

corresponding edges of a plurality of intervals of said first and said second sets align at a plurality of positions, the distance between said positions of alignment being defined by the equation:

$$D = N_1A = N_2B$$

where:

$D$ = the distance between positions of alignment;

$A$ and $B$ = the lengths of each of the intervals of said first and said second sets, respectively; and $N_1$ and $N_2$ = the smallest whole number integers satisfying the ratio $N_1/N_2 = B/A$ corresponding edges of a plurality of intervals of said second and third sets align at a plurality of positions, the distance between the second and third set positions being defined by the equation:

$$D' = N_3B = N_4C$$

where:

$C$ = the length of each interval of said third set; and $N_3$ and $N_4$ = the smallest whole number integers satisfying the ratio $N_3/N_4 = C/B$; and said closest permitted difference value uniquely identifies approximate cursor position over the distance defined by the equation:

$$D'' = N_5(N_1A) = N_6(N_3B)$$

where:

$D''$ = the distance over which said closest permitted difference uniquely identifies approximate cursor position; and $N_5$ and $N_6$ = the smallest integers satisfying the ration $N_5/N_6 = N_3/N_2$.

8. The device of claim 7 in which said utilization includes summing means for receiving said closest permitted value of said second order difference, said one first order difference, and one of said three coordinate position indicating signals, and combining the three received signals to provide an output precisely indicating cursor position.

* * * * *